Aug. 23, 1932.  C. F. JARVIS  1,873,414
DEMOUNTABLE ARM REST FOR MOTOR VEHICLES
Filed Dec. 1, 1930
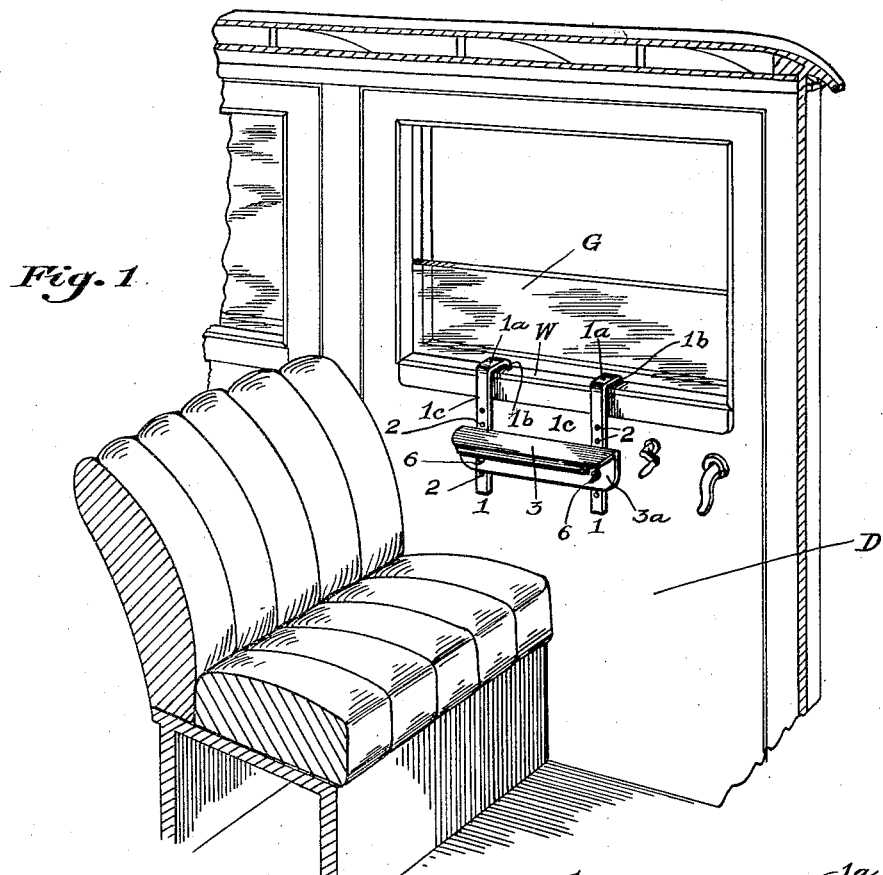
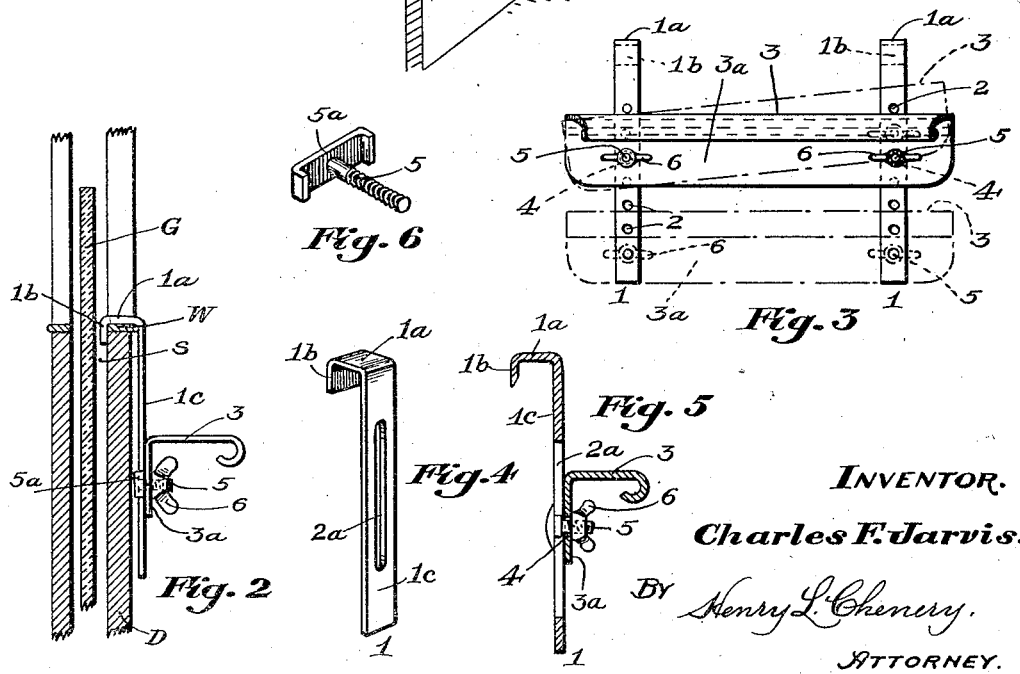
INVENTOR.
Charles F. Jarvis.
BY Henry L. Chenery.
ATTORNEY.

Patented Aug. 23, 1932

1,873,414

UNITED STATES PATENT OFFICE

CHARLES F. JARVIS, OF PORTLAND, MAINE

DEMOUNTABLE ARM-REST FOR MOTOR VEHICLES

Application filed December 1, 1930. Serial No. 499,217.

The invention hereinafter to be described relates, generally, to automotive accessories but deals more especially with improvements in an arm rest equipment for the doors of motor vehicles.

In the construction of automobiles there are many instances in which the windows of the forward doors are located at such a height above the seat as to make it impossible, or at least very inconvenient, for the ordinary individual to raise his arm sufficiently to rest it on the sill of the window, particularly if the latter be closed.

Furthermore, very few models of passenger vehicles provide conveniencies in the nature of arm rests on the forward doors anyway, and thus the occupants of the front seats are deprived of the benefits which otherwise might accrue were facilities at hand whereby one arm could be supported at a certain distance above his lap—such a convenience, for instance, as he enjoys while sitting in an arm chair in his own home.

And it is with the object in view to provide these fatigue-reducing facilities, ordinarily lacking in motor vehicles, that my present invention has been conceived.

The primary object of my invention is to supply a quickly mountable and demountable arm rest for the doors in the forward or operating compartment of motor vehicles, the equipment being self-contained or in unitary form and susceptible of being put in place by simply suspending it from the sill of the window in the door.

Thus the necessity for bolts, screws or other paraphernalia is obviated and the operation of attaching it to or removing it from the door requires but an instant of time.

It can, therefore, if at times its use is not required, be removed and stored in any available place in the automobile, from which place it can again be taken and quickly replaced with but little effort.

A further very important feature of my arm rest resides in its capacity for being located at various vertical distances above the seat, so that by adjustments, it readily adapts itself to the individual requirements of the user. And it is possible to locate the rest not only in various vertical, parallel planes, but it may be positioned in planes inclined from horizontal. So that, taken altogether, I provide an arm rest which will meet all conditions and fulfill all the various requirements of a device of this character.

I have illustrated my invention by the use of the accompanying drawing in which I have disclosed an embodiment which, at the present time, I consider preferable to other possible forms in which the invention might be carried out.

In the drawing—

Fig. 1 is a perspective view of my arm rest shown mounted on the door of a motor vehicle;

Fig. 2 is a fragmentary sectional elevation of a vehicle door with the device depicted in end elevation;

Fig. 3 illustrates the arm rest located in various positions on the supporting members;

Fig. 4 is a modification in the design of the supporting member;

Fig. 5 illustrates an alternative arrangement for securing the rest to the supporting members, and Fig. 6 is a view, in perspective, of one style of bolt adaptable for use in securing the parts together.

Similar reference characters are employed to identify like parts in all the different views.

Referring to the drawing, 1, 1, represent the hangers which constitute the supporting members for the arm rest. The upper, U shape ends 1a of the hangers rest on the top of the window sill W, and the short downturned portions 1b engage the edge of the sill adjacent the glass window pane G.

The long, depending portions 1c have a plurality of drilled or punched holes 2 quite closely spaced and disposed on the hangers for a considerable portion of their lengths.

Secured to the faces of the hangers is an angular bracket member 3 serving as the arm rest proper. In the vertical leg 3a of the arm rest are two holes 4.

Passing through each of the holes 4 is a bolt 5, the two bolts engaging, respectively, two holes 2 in the long leg 1a of the hangers. As shown in Figs. 2 and 6, this bolt 5 has a channel shape head 5a, the lipped portions of which, when the parts are being clamped together by the wing nut 6, engage the sides of the hanger portion 1a and prevent rotation of the bolt.

I may elect to construct the members 1 as illustrated in Figs. 4 and 5, which show, instead of the series of holes 2 a long slot 2a. This, obviously, will provide greater range of adjustability for the arm rest, but, due to the fact that the bolt might slip in the slot unless the proper strain was applied to the nut 6, the construction as first recited is preferable.

Fig. 3 illustrates the possibilities in the way of adjustments which can be made to position the arm rest in various places on the hangers. The full lines show the rest well up toward the top of the hangers, and the dot and dash lines other positions which it can easily be located in. And the simplicity of the structure and the completeness with which it fulfills the object for which it was conceived are appealing features of my arm rest which commend it to the motoring public.

In making attachment of the apparatus to the motor vehicle the hangers 1, 1 are first brought into close contact with the inside face of the door D, with the downwardly projecting portions 1b abutting on the window pane G. By lowering the whole device these portions 1b enter the space S on the inner side of the pane and this holds the apparatus against transverse displacement from off the door. The hangers may, however, be located in various positions longitudinally of the window pane by sliding them along the window sill W into contact with which the portions 1a of the hangers come when final location of the apparatus is effected.

If it is desired, for any reason, to remove the device from the vehicle door, all that is required is to lift it bodily until the projections 1b rise clear of the window sill; the whole affair can now be stored in any convenient place within or without the vehicle until further occasion for its use arises, the bolts 5 being slightly relaxed to permit of the hangers 1 being folded together at the side of the bracket member 3, making a small compact bundle and thereby reducing the space required for disposing of it when not in service.

While the arm rest has been illustrated and described in this application in connection with service on the windows of vehicle doors, it is obvious that its application on the fixed, side windows of the automobile is perfectly feasible and advantageous.

Having thus described my invention, what I claim and desire to secure by Letters Patent is:

1. A demountable arm-rest for motor vehicles adapted to be suspended from the window sill thereof, comprising an angular bracket, an aperture in the vertical leg of said bracket near each end thereof, a bolt operable in each of said apertures, a hanger disposed on the vertical leg of said bracket near each end thereof, each of said hangers having a plurality of bolt-receiving holes therein, the two said bolts adapted, respectively, to permit of said hangers being pivotally mounted thereover and secured on said bracket in a plurality of different positions, relatively, whereby said bracket may be disposed on said hangers in various vertically separated planes running parallel with said window sill, or disposed in planes inclined in either direction therefrom, the pivotal mounting of said hangers further permitting them to be folded into substantially longitudinal alignment with said bracket, and hooks on the upper ends of said hangers adapted to engage said window sill and extend downwardly on the outer side thereof.

2. An arm rest for motor vehicles adapted to be suspended, within said vehicle, from the sill of the window frame of the vehicle door, comprising an L shape bracket member having two holes in the vertical leg thereof, a rolled edge portion on the horizontal leg of said bracket member, two bracket-supporting hangers vertically aligning, respectively, with the two said holes, each of said supporting members including a long leg disposed against the inner side of said door, a transverse portion lying on and extending across the top of said sill and a short leg depending into the interior space in said window frame, adjacent the outer edge of said sill, a bolt-receiving aperture in the long leg of said supporting member, a bolt extending through said aperture and through one of the holes in said bracket member, means to prevent rotation of said bolt, a nut on said bolt adapted in co-action with said bolt to clamp said supporting member to said bracket member, and means whereby said clamping elements may be effective to fixedly secure said L shape bracket member to said supporting members in a plurality of positions on and with relation to said supporting members.

In testimony whereof I affix my signature.

CHARLES F. JARVIS.